United States Patent [19]

de Man

[11] 3,879,063

[45] Apr. 22, 1975

[54] METHOD FOR SIMULTANEOUSLY CUTTING AND HEADING PLASTIC STUDS

[75] Inventor: Heiko T. de Man, Alameda, Calif.

[73] Assignee: Velo-Bind, Inc., Sunnyvale, Calif.

[22] Filed: July 12, 1972

[21] Appl. No.: 271,020

Related U.S. Application Data

[62] Division of Ser. No. 114,557, Feb. 11, 1971, Pat. No. 3,689,185.

[52] U.S. Cl................ 281/21 R; 264/68; 264/163; 264/249
[51] Int. Cl........................ B29c 17/10; B42d 1/06
[58] Field of Search............... 264/163, 249, 68, 98, 264/DIG. 76; 281/21 R; 11/1 R

[56] References Cited

UNITED STATES PATENTS

| | | | |
|---|---|---|---|
| 3,160,690 | 12/1964 | Schaich | 264/98 |
| 3,596,929 | 8/1971 | Abildgaard et al. | 11/1 R |
| 3,691,267 | 9/1972 | Takehara | 264/98 |
| 3,730,560 | 5/1973 | Abildgaard et al. | 281/21 R |

Primary Examiner—Robert F. White
Assistant Examiner—James B. Lowe
Attorney, Agent, or Firm—Julian Caplan

[57] ABSTRACT

To cut and form heads on a plastic stud or rod, particularly in binding papers together, a rotating tool of special construction is forced against a conical concave cam surface. The tool has a hollow shank with at least one flexible arm extending therefrom, said arm formed with a head, the arm being normally outwardly slanted so that the head is spaced outward of the axis of rotation. Each head has an inward projecting blade at its distal end. The space between the axis and the inner edge of the blade in normal position is sufficient to permit longitudinal movement of the stud inward of the head. The exterior of the distal end of the head is conical, convex and complementary to the cam. As the tool head is brought toward the cam, the head is forced inward causing the blade to sever the stud. Simultaneously the distal end of the head as it spins splays the severed end of the stud, forming a rivet head, which holds the papers in place. In a preferred embodiment there are two cooperating heads on the tool.

3 Claims, 5 Drawing Figures

METHOD FOR SIMULTANEOUSLY CUTTING AND HEADING PLASTIC STUDS

This application is a division of Ser. No. 114,557, filed Feb. 11, 1971, now U.S. Pat. No. 3,689,185.

This invention relates to an improved method for cutting and heading plastic studs.

A feature of the present invention is the fact that it may be practiced in a business office bend sheets of paper or books together, using two plastic strips, one having spaced studs which project through holes in the sheets and the second formed with apertures to receive the ends of the studs. The two strips are pressed toward each other with the sheets to be bound interposed and with the studs fitting through the holes in the sheets and through the apertures in the second strip. The excess length of each stud is sheared off by means of a rotating tool having a blade which is brought inward as the tool is advanced toward the second strip. The head of the tool simultaneously splays the portion of the stud which remains after the excess has been severed, deforming the said remaining portion into a head similar to a rivet head.

One of the features of the invention is the fact that the method bind a wide variety of types of materials. Thus ordinary paper which has been punched or drilled adjacent one margin may be used. It is sometimes desirable to rebind books or to bind assembled pamphlets, magazines or the like. Further, books similar to conventional books may be bound. The versatility of the machine is an important feature of the invention.

Another feature of the invention is the wide range of thickness of pages accommodated. The studs of the first strip are of extended lengths so as to fit through a relatively thick book. The machine shears off the excess lengths of the studs where less than maximum length is required. The effectiveness of the binding is relatively independent of the thickness of the paper involved.

Another feature of the method is the fact that the sheets are tightly pressed together and then secured into place in compressed condition.

Another feature is that the method is easily operated by relatively untrained personnel. Little or no physical effort is required to operate the machine and the machine is quite rapid in operation, particularly as compared to conventional bookbinding practices.

Other objects of the present invention will become apparent upon reading the following specification and referring to the accompanying drawings in which similar characters of reference represent corresponding parts in each of the several views.

Figure 1:
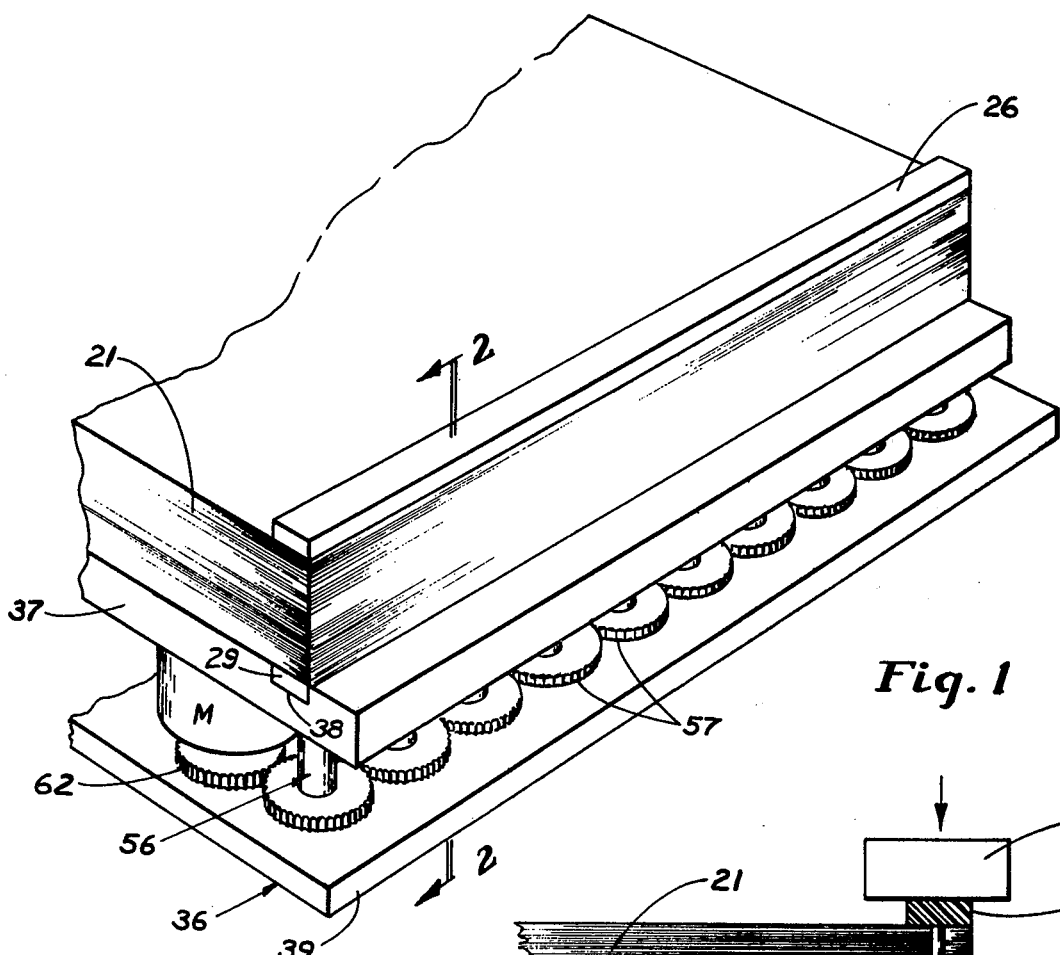
FIG. 1 is a partially schematic, fragmentary, perspective view of a machine in accordance with the present invention.
Figure 2:
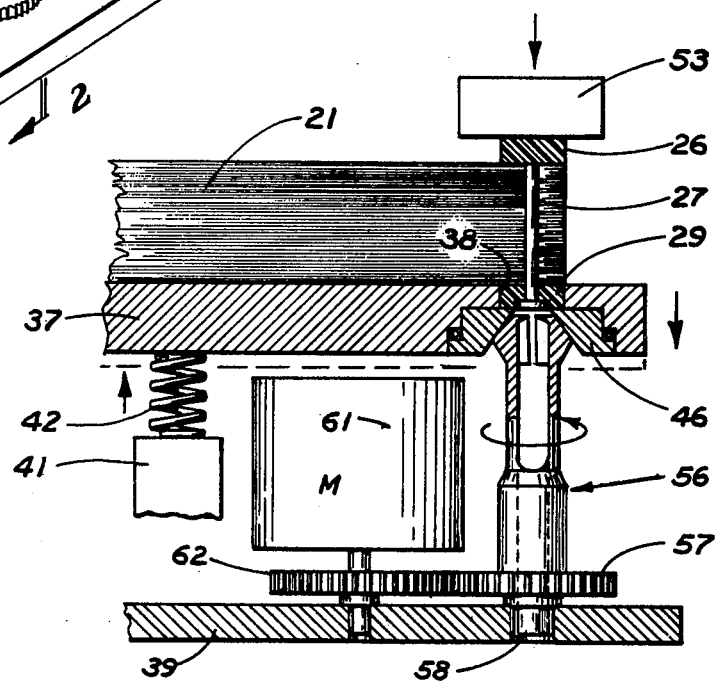
FIG. 2 is an enlarged fragmentary sectional view taken substantially along the line 2—2 of FIG. 1.

The method hereinafter described is used to bind together temporarily or permanently pluralities of sheets of paper 21 which may be provided with front or back cover sheets, all formed with a series of spaced holes 22 along one margin thereof. A first plastic strip 26 of a length approximately equal to the length of the sheets 21 is provided with studs 27 spaced along the strip 26 at intervals corresponding to the spacing between holes 22. The studs 27 may be formed with pointed ends 28. Cooperating with first strip 26 is a second strip 29 formed with holes 31 spaced apart the same distance as studs 27 and dimensioned to accept the same. Preferably, one surface of strip 29 is formed with counterbores 32. Strips 26 and 29 may be formed with various plastic materials, preferably a polyvinyl chloride or some other similar suitable material which is capable of being deformed both by cold flowing and by heat. Strip 26 is preferably rectangular in cross-section and is about one fourth wide and one sixteenth thick. The studs 27 are preferably between three thirty-seconds and one eighth in diameter and may be of a length up to about 3. The second strip 29 is approximately one fourth in width and one sixteenth in thickness and the holes 31 are of slightly larger diameter than the studs 27.

As has previously been stated, the sheets 21 may be separate sheets of printed or typewritten material or copies thereof or they may be pamphlets, magazines or the like which are formed with holes 22 in order to bind the material together in a book. Thus, the type of material which may be used with the present invention, the dimensions of the sheets 21 which will be accepted, and the thickness of the book which is to be bound are subject to considerable variation.

Figure 3:
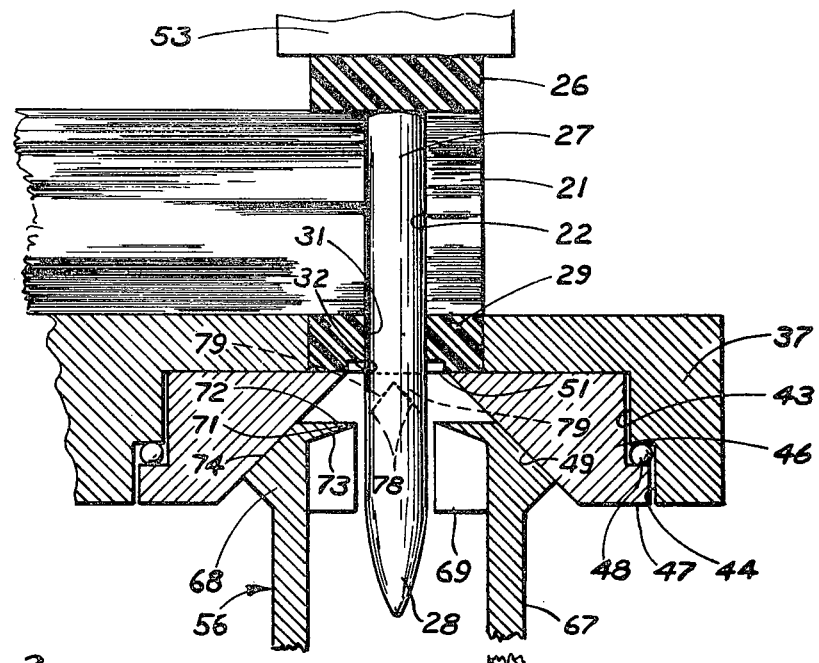
FIG. 3 is a further enlarged, fragmentary sectional view through a portion of the machine showing the tool in position at the commencement of the cutting and heading operation.

The machine 36 is illustrated herein more or less schematically, it being understood that it is of a size that may be mounted on the desk or table of a business office, or it may be made suitably larger and used by commercial binding establishments. A horizontal support 37 is provided which is dimensioned to support the largest of the sheets 21 which the machine will accept. Adjacent one edge of support 37 is a rectangular depression 38 which is complementary to strip 29 and receives such strip with countersinks 32 down. The sheets 21 are then positioned on the support 37 with their holes 22 aligned with the holes 31 in strip 29. Suitable aligning stops (not shown) may be used to properly position the sheets 21. After the sheets 21 have been properly positioned, the strip 26 is installed the studs 27 being inserted through the holes 22 and through the holes 31 in strip 29. As is best shown in FIG. 3, the points 28 of each stud 27 project beyond strip 29, the amount of projection depending upon the thickness of the sheets 21.

Support 37 has a base 39 and interposed between base 39 and support 37 is a foot 41 having a spring 42 which biases support 37 upwardly to create pressure against the bottom of the stack of paper 21. As viewed in the drawings, the underside of support 37 is formed with a plurality of bores 43 and counter-bores 44 corresponding in number and spacing to studs 27. It will be understood that the preferred location of support 37 is horizontal and below the sheets to be assembled, but the relative location may be varied. Each bore 43 accepts cam member 46 which is formed with a peripheral flange 47 which fits in counter-bore 44. Balls 48 are interposed between support 37 and cam 46 so that the cam may revolve during the operation of the apparatus as hereinafter explained. Rotation of the cam 46 is not essential although it is highly desirable in the operation of the apparatus. The underside of each cam 46 is formed with a conical cam surface 49. At the center of each cam surface 49 is a hole 51 which is aligned with the hole 31 in strip 29. Above support 37 is a pressure bar 53 which is forced down on top of strip 26, pressing the sheets 21 down upon the support 37 against the force of spring 42. The position of the parts after bar 53 has been lowered and before other steps are performed is shown in FIG. 3.

For each stud 27 there is a tool 56, hereinafter described in detail, which is provided at its proximal end with a gear 57 having a stub shaft 58 which is rotatably mounted in base 39. Likewise mounted on base 39 is a motor 61 having a pinion 62 which meshes with one of the gears 57 and preferably the gears 57 for all of the tools 56 mesh so that the tools 56 are driven in unison. However, various other means may be used to drive the tools 56 as will occur to one skilled in the art.

Each tool 56 has a shank 66 which is preferably hollow at its proximal end. Extending distally of shank 66 are arms 67, which are here shown to be two in number but which may be any convenient number, formed of spring steel or other suitable material. The arms 67 at the inception of the cycle of operation of the tool slant upwardly-outwardly. On the distal end of each arm 67 is the head 68. At the extreme end of each head 68 is a cylindrical portion 69 and where there are two arms 67, each portion 69 is approximately semi-cylindrical. At the distal of each portion 69 is a blade 71 having a distally inwardly slanted surface 73 and an approximately flat end surface 72 which is radial relative to the axis of rotation of the tool. The exterior of each head 68 is a conical surface 74 which is complementary to the surface 49 of the cam 46. The arms 67 are resilient enough so that said head 68 bends inward and rigid enough so that said blade 71 cuts said stud 27 and forms said rivet-like head 77.

Figure 4:
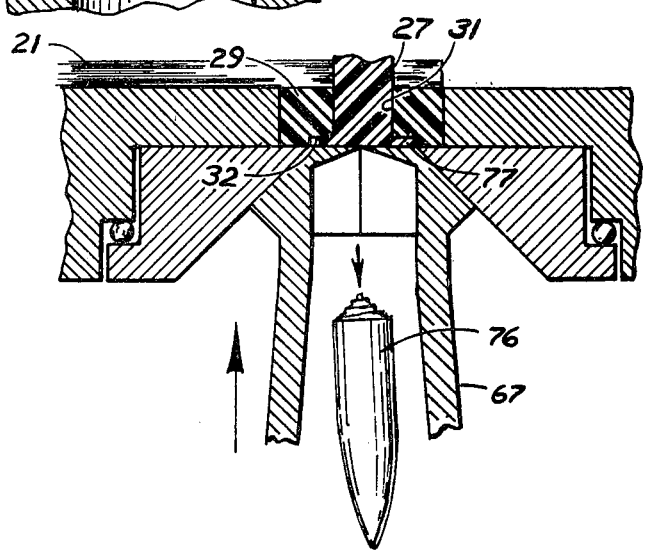
FIG. 4 is a view similar to FIG. 3 showing the tool at the conclusion of the heading operation.
Figure 5:
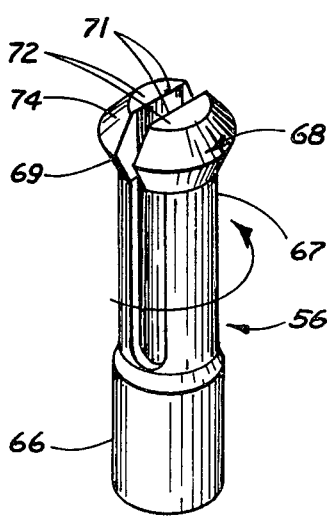
FIG. 5 is a perspective view of the tool of the present invention.

At the outset of the shearing and head forming operation, support 37 is backed off from tools 56 so that arms 67 extend slanting outward and studs 27 are freely accepted between the heads 68 without interference. The shank 66 is rotated (as by means of motor 61) and the action of the pressure bar 53, after compressing pages 21 and overcoming spring 42 on foot 41, forces support 37 containing cam surface 49 toward heads 68. The action of cams 49 is to press the heads 68 toward each other and toward the axis of rotation. As the blades 71 move inwardly and upwardly, they cut the excess length of each stud 27 theoretically in a conical shape defined by dotted line 78. However, not only is the excess length 76 of the stud 27 sheared off as the blades move together (i.e. move from the position of FIG. 3 to FIG. 4) but the surfaces 72 engage the volume of stud material which is indicated generally by reference numerals 79, heating by friction, cold flowing and splaying the material 79 outwardly and upwardly into the counterbore 32 in strip 29, forming a head 77 on the end of stud 27 within the counterbore 32. The head is formed by a combination of heat generated by the friction of the head 68 against the material 79 and also by the mechanical deformation of the plastic material. The tool 56 is withdrawn from the position shown in FIG. 4 and the head 77 is allowed to cool and thus rigidify while pressure on sheets 21 is maintained.

Thereupon, the pressure bar 53 is removed and the completed book is removed from support 37.

In the completed book, the studs 27 extend through the holes of the sheets 21 between the first strip 26 and the second strip 27 and the heads 77 formed on the ends of the studs lock the book in position.

What is claimed is:

1. A method of cutting and heading a thermo-plastic stud comprising providing a tool having a proximal shank, means on said shank cooperable with external means for revolving said shank about an axis of rotation, at least one arm of resilient material extending distally of said shank and normally slanting distally outwardly, and a head on the distal end of said arm, said head having an external conical cam surface, a transverse distal end surface, and a blade on the inner edge of said head, revolving said tool about said axis of rotation, providing a second conical cam surface complementary to said first cam surface on said tool, moving said conical surfaces toward each other along said axis of rotation, said stud initially extending through a hole in said second cam surface and extending along the axis of said tool inward of said head and being fixed in position relative to said cam surface said head being forced inward of said axis as said cam surface and said tool move toward each other to simultaneously cut off said stud and deforming the severed end of said stud by splaying said end outwardly and axially to form a rivet-like head, said arm being resilient enough so that said head bends inward and rigid enough so that said blade cuts said stud and forms said rivet-like head.

2. A method of binding a book from pages having spaced first holes along one margin comprising providing a first strip of plastic having a plurality of studs spaced apart the same distance as said first holes and a second strip formed with second holes spaced apart the same distance as said studs, inserting said studs through the first holes and then the second holes, forcing said strips toward each other with the pages clamped between said strips, supporting said second strip on a support surface having conical cam surfaces formed with third holes aligned with said studs, said studs protruding beyond said third holes and being fixed in position relative to said cam surfaces; providing for each stud a tool, said tool comprising a proximal shank, means on said shank cooperable with external means for revolving said shank, at least one arm of resilient material extending distally of said shank and normally slanting distally outwardly, and a head on the distal end of said arm, said head having an external conical cam surface, a transverse distal end surface, and a blade on the inner edge of said head, said stud initially extending through said third hole and radially inward of said head, revolving said tool and moving said tool and said cam surface relatively toward each other thereby simultaneously forcing said blade to cut off said stud and deforming the severed end of said stud by splaying said end outwardly and axially toward said second strip to form a rivet-like head, said arm being resilient enough so that said head bends inward and rigid enough so that said blade cuts said stud and forms said rivet-like head.

3. A method according to claim 2 in which said second holes are counterbored and said severed end of said stud is deformed into said counterbore.

* * * * *